United States Patent
Bari et al.

(10) Patent No.: US 10,293,848 B2
(45) Date of Patent: May 21, 2019

(54) RACK BALL NUT ASSEMBLY FOR A VEHICLE STEERING GEAR AND RELATED COMPONENTS THEREOF

(71) Applicant: TRW Automotive U.S. LLC, Livonia, MI (US)

(72) Inventors: Praful Bari, Livonia, MI (US); Jeffrey Beyerlein, Livonia, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 15/531,132

(22) PCT Filed: Dec. 3, 2015

(86) PCT No.: PCT/US2015/063628
§ 371 (c)(1),
(2) Date: May 26, 2017

(87) PCT Pub. No.: WO2016/090088
PCT Pub. Date: Jun. 9, 2016

(65) Prior Publication Data
US 2017/0361866 A1    Dec. 21, 2017

Related U.S. Application Data
(60) Provisional application No. 62/086,998, filed on Dec. 3, 2014.

(51) Int. Cl.
*B62D 5/04*    (2006.01)
*F16H 25/22*    (2006.01)
(Continued)

(52) U.S. Cl.
CPC ....... *B62D 5/0448* (2013.01); *F16H 25/2214* (2013.01); *F16H 7/02* (2013.01); *F16H 25/2223* (2013.01); *F16H 2025/2096* (2013.01)

(58) Field of Classification Search
CPC .... B62D 55/108; B62D 55/06; B60G 13/003; B60G 2204/128; F16F 1/121; F16F 1/128
See application file for complete search history.

(56) References Cited

U.S. PATENT DOCUMENTS 6,439,338 B2    8/2002    Yoshioka et al.
6,454,042 B1    9/2002    Yoshida et al.
(Continued)

FOREIGN PATENT DOCUMENTS

CN    101024402 A    8/2007
DE    102007049832 A1    4/2009
(Continued)

OTHER PUBLICATIONS

First Chinese Office Action, Application No. 201580071559.6, dated Nov. 2, 2018.

*Primary Examiner* — Kevin Hurley
*Assistant Examiner* — Marlon A Arce
(74) *Attorney, Agent, or Firm* — MacMillan, Sobanski & Todd, LLC

(57) ABSTRACT

A rack ball nut assembly for a vehicle steering gear has a ball nut, a ball return tube, and a tube retention clip. The ball nut has first and second recesses and the ball return tube has first and second tube portions. There is a snap fit between the first and second tube portions. The tube retention clip has first and second retention tabs. The first tab is engaged in the first recess and the second tab is engaged in the second recess. The ball return tube is secured between the ball nut and the tube retention clip.

18 Claims, 7 Drawing Sheets

(51) Int. Cl.
*F16H 25/20* (2006.01)
*F16H 7/02* (2006.01)

(56) References Cited

U.S. PATENT DOCUMENTS

| | | | |
|---|---|---|---|
| 7,631,572 B2* | 12/2009 | Fujita | B62D 5/0448 384/43 |
| 8,397,859 B2 | 3/2013 | Asakura et al. | |
| 8,813,903 B2 | 8/2014 | Asakura et al. | |
| 8,960,037 B2* | 2/2015 | Yamanaka | B62D 5/001 180/402 |
| 2007/0204711 A1* | 9/2007 | Budaker | B62D 5/0448 74/388 PS |

FOREIGN PATENT DOCUMENTS

| | | |
|---|---|---|
| DE | 502005009489 D1 | 6/2010 |
| DE | 102011013190 A1 | 2/2012 |
| DE | 102010051268 A1 | 5/2012 |
| EP | 1630456 B1 | 8/2011 |
| EP | 1524171 B1 | 11/2011 |
| ES | 2393421 T3 | 12/2012 |
| JP | 2004100816 A | 4/2004 |
| JP | 2005155720 A | 6/2005 |
| JP | 2005299721 A | 10/2005 |
| JP | 2005308141 A | 11/2005 |
| JP | 3844922 B2 | 11/2006 |
| JP | 3844943 B2 | 11/2006 |
| JP | 2007255435 * | 10/2007 |
| JP | 2007255435 A | 10/2007 |
| JP | 2008202672 A | 9/2008 |
| JP | 2008208974 A | 9/2008 |
| JP | 2010031930 A | 2/2010 |
| JP | 2010038217 A | 2/2010 |
| JP | 4807655 B2 | 11/2011 |
| JP | 4885691 B2 | 2/2012 |
| JP | 4907531 B2 | 3/2012 |
| JP | 2012077871 A | 4/2012 |
| JP | 2013075546 A | 4/2013 |
| KR | 1181074 B1 | 9/2012 |
| KR | 1240087 B1 | 3/2013 |
| WO | 03095869 A1 | 11/2003 |
| WO | 2006061104 A1 | 6/2006 |

* cited by examiner

RACK BALL NUT ASSEMBLY FOR A VEHICLE STEERING GEAR AND RELATED COMPONENTS THEREOF

CROSS REFERENCE TO RELATED APPLICATION

This application claims priority to, and the benefit of, U.S. Provisional Application Ser. No. 62/086,998, filed Dec. 3, 2014, the full disclosure of which is incorporated herein by reference.

BACKGROUND OF INVENTION

This invention relates in general to vehicle steering gears and in particular to an improved rack ball nut assembly for use in such vehicle steering gears and related components thereof.

One known power steering gear for turning steerable wheels of a vehicle includes a rack ball nut assembly for transmitting force between an axially movable rack member and a power source. For example, the power source may be an electric motor or hydraulic system. Upon actuation of the power source, the ball nut is driven to rotate relative to the rack member and the rotational force of the ball nut is transmitted to the rack member by balls that drive the rack member axially. The axial movement of the rack member by the balls effects turning movement of the steerable wheels. Turning movement of the steerable wheels is controlled by a driver rotating a steering wheel. Rotating the steering wheel activates the power source.

The rack ball nut assembly typically includes a means for returning the balls from a first end to a second end of the ball nut. Commonly, the means is a ball return tube secured by a clip screwed to the ball nut, which increases complexity of assembling the rack ball nut assembly. The ball return tube may be manufactured from tube portions that are welded together. However, welding the tube portions together may result in defects or other undesirable effects. For example, laser welding may distort geometry of the tube and ultrasonic welding may create flash during welding. Thus, it would be desirable to have a rack ball nut assembly that did not require screws or welding.

SUMMARY OF INVENTION

This invention relates to a rack ball nut assembly for use in a vehicle steering gear and a vehicle steering gear including such a rack ball nut assembly.

According to one embodiment, a rack ball nut assembly for a vehicle steering gear may comprise, individually and/or in combination, one or more of the following features: a ball nut, a ball return tube, and a tube retention clip. The ball nut has first and second recesses and the tube has first and second tube portions. There is a snap fit between the first and second tube portions. The clip has first and second retention tabs. The first tab is engaged in the first recess and the second tab is engaged in the second recess. The tube is secured between the ball nut and the clip.

According to another embodiment, a rack ball nut assembly for a vehicle steering gear may comprise, individually and/or in combination, one or more of the following features: a ball nut and a ball return tube. The ball nut has first and second openings and the tube has first and second tube portions. The tube connects the first and second openings. There is a snap fit between the first and second tube portions. A plurality of balls circulate through the tube between the first and second openings.

According to another embodiment, a rack ball nut assembly for a vehicle steering gear may comprise, individually and/or in combination, one or more of the following features: a ball nut and a tube retention clip. The ball nut has first and second recesses and the clip has first and second opposing legs. The first leg has a first retention tab and the second leg has a second retention tab. The first tab is engaged in the first recess and the second tab is engaged in the second recess.

A potential advantage of an embodiment of the rack ball nut assembly is manufacturing of the assembly without welding. Another potential advantage is the clip is secured to the ball nut without screws. Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
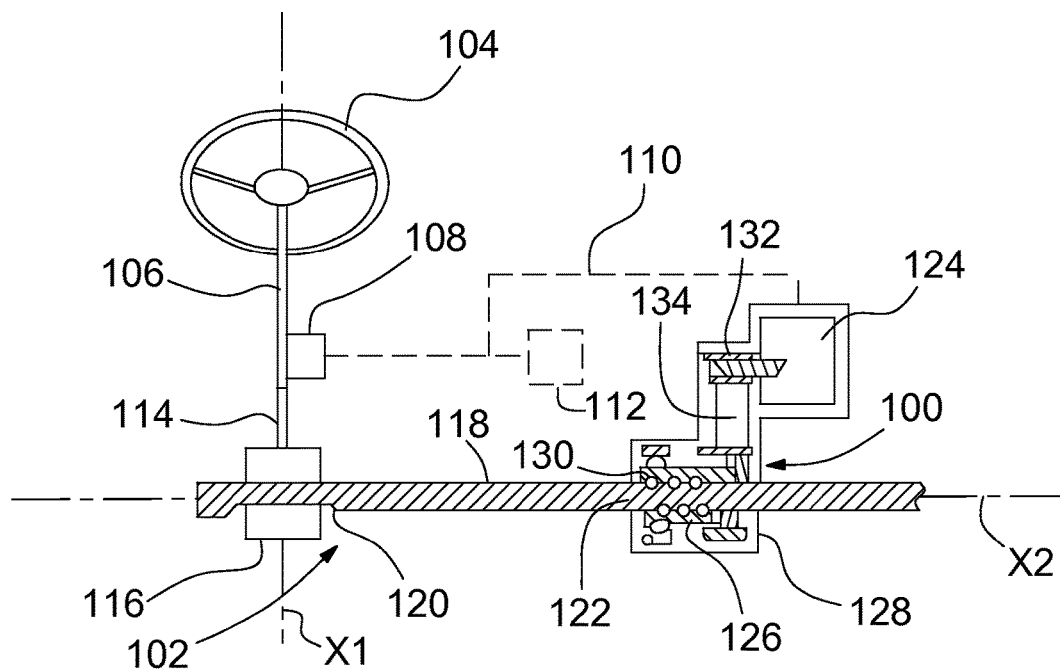
FIG. 1 is a schematic view of a vehicle steering gear using a first embodiment of a rack ball nut assembly in accordance with the present invention.

Referring now to FIG. 1 there is a first embodiment of a rack ball nut assembly, indicated generally at 100, produced in accordance with the present invention and for use with a vehicle steering gear, indicated generally at 102. The general structure and operation of the vehicle steering gear 102 is conventional in the art. Thus, only those portions of the vehicle steering gear 102 which are necessary for a full understanding of this invention will be explained and illustrated in detail.

As illustrated, the vehicle steering gear 102 is an electric power steering (EPS) assembly comprising a vehicle electric belt driven rack drive steering assembly and is associated with the front driven wheels (not illustrated) of the vehicle. Also, although the rack ball nut assembly 100 will be described and illustrated in connection with the particular vehicle steering gear 102 disclosed herein, it will be appreciated that the rack ball nut assembly 100 may be used in connection with other vehicle power steering assemblies, including other electric, hydraulic, or otherwise powered power steering assemblies known to those skilled in the art.

The illustrated vehicle steering gear 102 includes a vehicle steering wheel 104 and a rotatable input shaft 106 which is operatively coupled, in a manner not illustrated, to the steering wheel 104 for rotation therewith about a steering axis X1. A torque sensor 108 encircles the input shaft 106. The torque sensor 108 responds to rotation of the input shaft 106 and detects a direction and magnitude of applied steering torque. The direction and magnitude of applied steering torque are communicated, via a data network 110, to an electronic control unit 112.

A torsion bar 114 is provided to connect the input shaft 106 to a pinion 116. The torsion bar 114 twists in response to the steering torque applied to the steering wheel 104. When the torsion bar 114 twists, relative rotation occurs between the input shaft 106 and the pinion 116.

A linearly movable steering member 118 is linearly (or axially) movable along a rack axis X2. A rack portion 120 is provided with a series of rack teeth (not illustrated) which meshingly engage gear teeth (not illustrated) provided on the pinion 116. The steering member 118 further includes a screw portion 122 having an external screw thread (not illustrated). The steering member 118 is connected with steerable wheels (not illustrated) of the vehicle through tie rods (not illustrated) located at the distal ends of the steering member 118. Linear movement of the steering member 118 along the rack axis X2 results in steering movement of the steerable wheels in a known manner.

The steering gear 102 further includes a power source 124, illustrated as an electric motor, which is drivably connected to the rack ball nut assembly 100. Alternatively, as known to those skilled in the art, the power source 124 may be other than the electric motor. For example, the power source 124 may be a hydraulic system. The power source 124 is actuated by the electronic control unit 112.

The rack ball nut assembly 100 effects axial movement of the steering member 118 upon rotation of the steering wheel 104. In the event of the inability of the power source 124 to effect axial movement of the steering member 118, the mechanical connection between the gear teeth on the pinion 116 and the rack teeth on the rack portion 120 of the steering member 118 permits manual steering of the vehicle. The rack ball nut assembly 100 encircles the screw portion 122 of the steering member 118.

The rack ball nut assembly 100 includes a ball nut 126, rotationally fixed to a first pulley 128, and a plurality of force-transmitting members. The force transmitting members comprise balls 130, which are disposed between the ball nut 126 and the screw portion 122 of the steering member 118. The ball nut 126 is supported by the balls 130 on the steering member 118. The balls 130 are loaded into the rack ball nut assembly 100 in a known manner.

The power source 124 rotationally drives a second pulley 132 which is connected to a member 134 for rotation therewith. For example, the member 134 may be a timing belt. The timing belt 134 is operatively connected to the first pulley 128. Thus, when the power source 124 is actuated, the timing belt 134 is rotated via the second pulley 132 so as to rotate the first pulley 128. The rotation of the first pulley 128 causes the ball nut 126 to be rotated and thereby produce axial movement of the steering member 118 via the balls 130.

Figure 2:
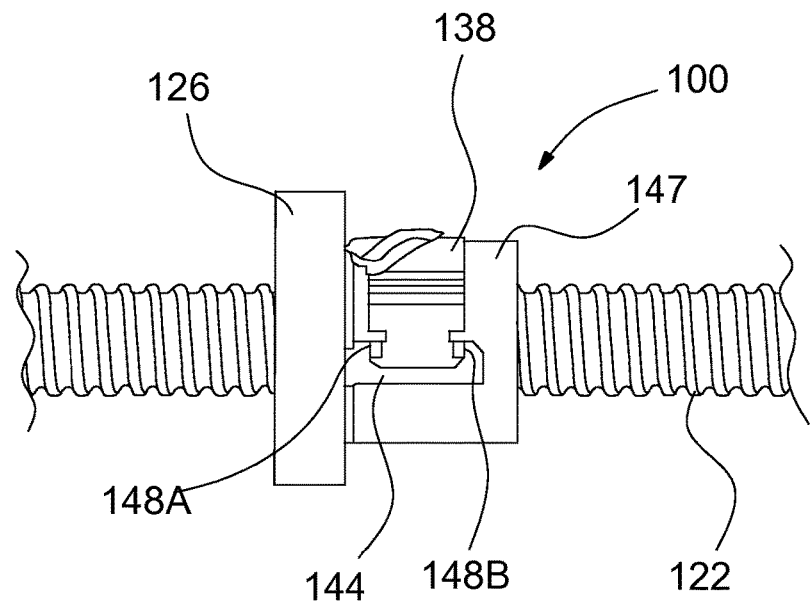
FIG. 2 is a side elevation view of the rack ball nut assembly of FIG. 1.
Figure 3:
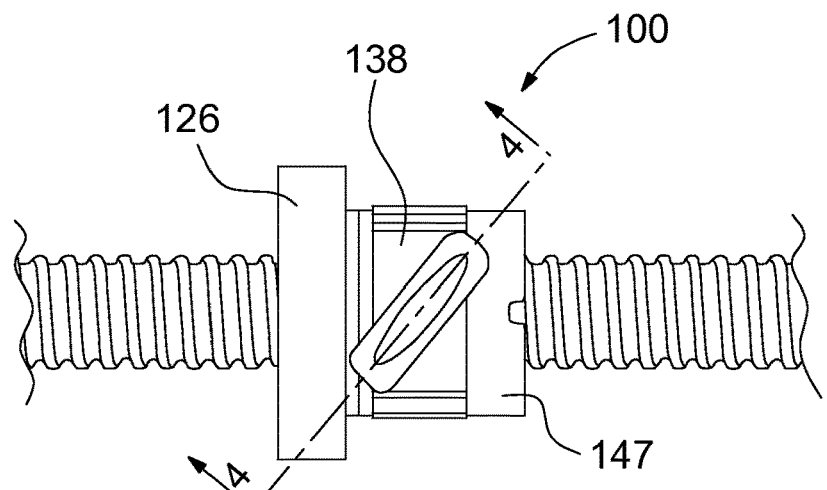
FIG. 3 is a top elevation view of the rack ball nut assembly of FIG. 1.
Figure 4:
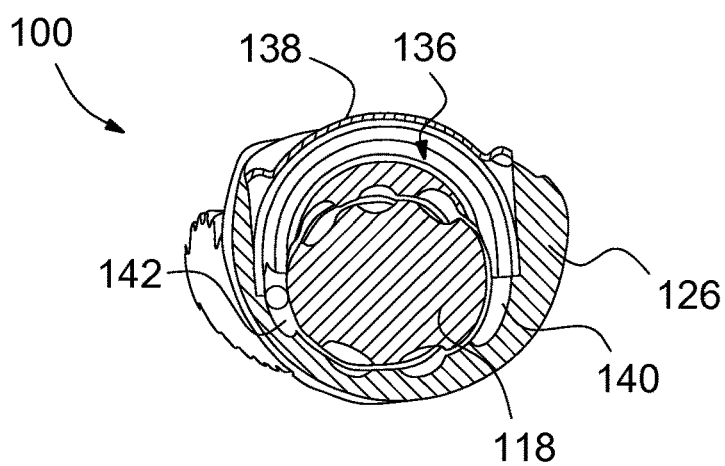
FIG. 4 is a cross section taken along line 4-4 of FIG. 3.
Figure 5:
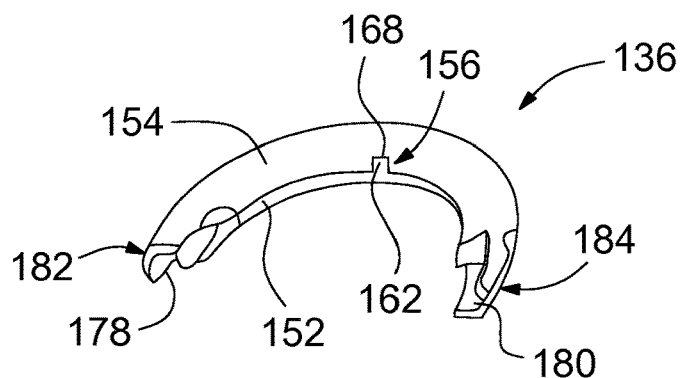
FIG. 5 is a perspective view of a ball return tube used in the rack ball nut assembly of FIG. 1.
Figure 6:
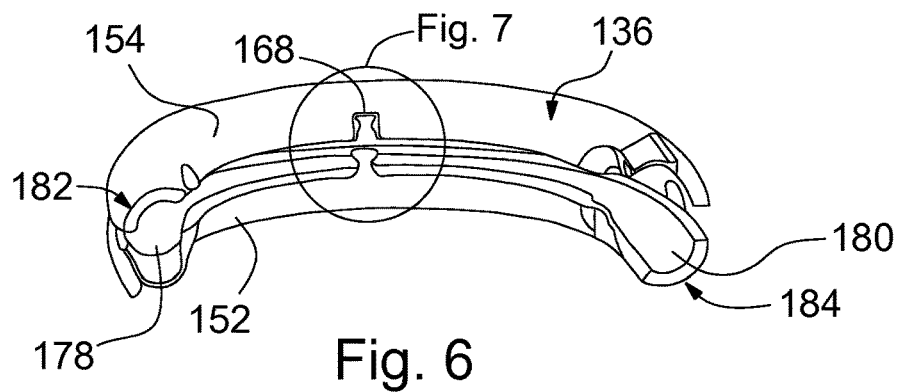
FIG. 6 is an exploded view of the ball return tube used in the rack ball nut assembly of FIG. 1.
Figure 7:
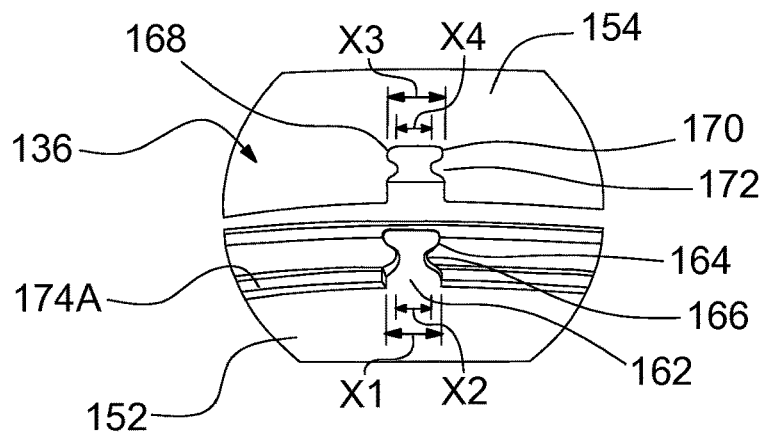
FIG. 7 is an enlarged portion of FIG. 6.
Figure 8:
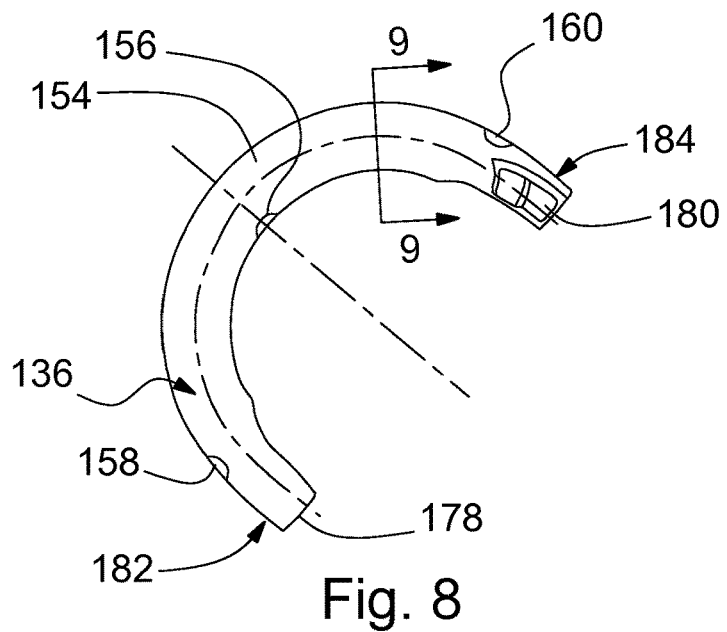
FIG. 8 is a top elevation view of the ball return tube used in the rack ball nut assembly of FIG. 1.
Figure 9:
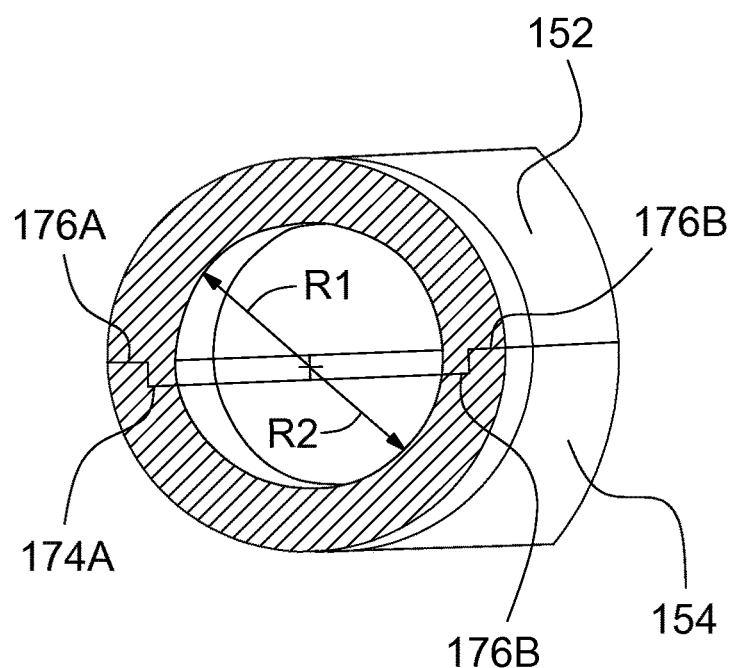
FIG. 9 is a sectional view taken along line 9-9 of FIG. 8.

Referring now to FIGS. 2-4, the rack ball nut assembly 100 includes a ball return tube, indicated generally at 136, and a tube retention clip 138.

The tube 136 connects first and second openings 140 and 142, respectively, through the ball nut 126. The balls 130 repeatedly circulate between the screw portion 122 and ball nut 126, through the first opening 140, through the tube 136, through the second opening 142, and back between the screw portion 122 and ball nut 126. The balls 130 may also circulate through the tube 136 from the second opening 142 to the first opening 140. The tube 136 is secured between the ball nut 126 and the clip 138.

Figure 13:
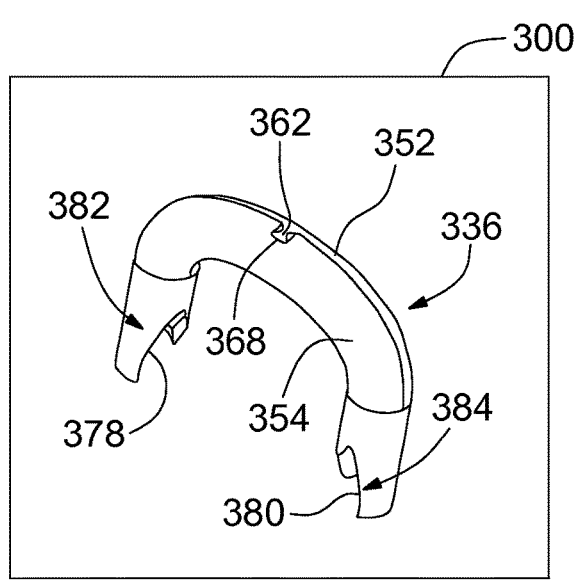
FIG. 13 is a perspective view of a ball return tube used in a second embodiment of a rack ball nut assembly in accordance with the present invention.
Figure 14:
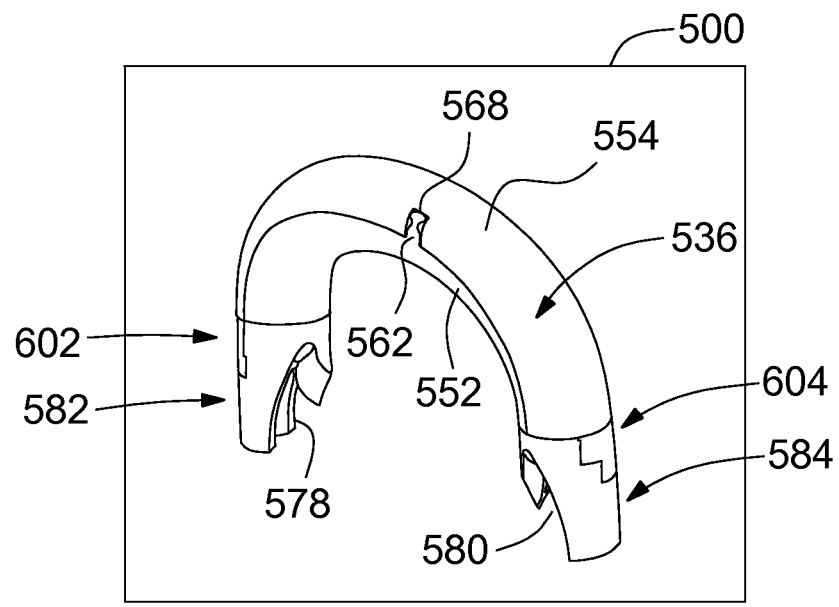
FIG. 14 is a perspective view of a ball return tube used in a third embodiment of a rack ball nut assembly in accordance with the present invention.

The ball nut 126 has first and second recesses 144 and 146, respectively, (the second recess 146 is best illustrated in FIG. 14) in an external surface 147. As illustrated, the first and second recesses 144 and 146 are on opposite sides of the ball nut 126. Alternatively, the first and second recesses 144 and 146 may be on other than opposite sides of the ball nut 126. As will be discussed further, the clip 138 has first and second tabs 148A and 148B, respectively, are engaged in the first recess 144 and third and fourth tabs 150A and 150B, respectively, are engaged in the second recess 146 (the third and fourth tabs are best shown in FIG. 13) to attach the clip 138 to the ball nut 126. The first and second tabs 148A and 148B, respectively, engaged in the first recess 144 and the third and fourth tabs 150A and 150B engaged in the second recess 146 secure the clip 138 to the ball nut 126. The clip 138 being secured to the ball nut 126 secures the tube 136 between the ball nut 126 and the tube 136 and secures the tube 136 in the first and second openings 140 and 142, respectively.

Referring now to FIGS. 5-9, the tube 136 is illustrated in detail. The tube 136 is formed from first and second tube portions 152 and 154, respectively. The first and second tube portions 152 and 154, respectively, are held together by first, second, and third snap fits 156, 158, and 160, respectively. The second and third snap fits 158 and 160, respectively, are similar to the first snap fit 156. As such, discussion of the first snap fit 156 is also applicable to the second and third snap fits 158 and 160, respectively. While the tube 136 is illustrated having three snap fits—i.e., the first, second, and third snap fits 156, 158, and 160, respectively—the tube 136 may also have fewer or more than three snap fits.

The first snap fit 156 has a male snap 162 extending from the first tube portion 152 and a female snap 168 in the second tube portion 154. Alternatively, the male snap 162 may extend from the second tube portion 154 and the female snap 168 may be in the first tube portion 152. The male snap 162 has a head portion 164 with a first width X1 and a stem portion 166 with a second width X2. The first width X1 is greater than the second width X2. The female snap 168 has a receiving portion 170 with a third width X3 and a channel portion 172 with a fourth width X4. The third width X3 is greater than the fourth width X4. When the first and second tube portions 152 and 154, respectively, are assembled into the tube 136, the head portion 164 is restrained or engaged in the receiving portion 170 by the channel portion 172. For example, the channel portion 172 may restrain the head portion 164 in the receiving portion 170 by an interference fit between the head portion 164 and the channel portion 172 or the stem portion 166 and the channel portion 172.

The first tube portion 152 has a first cross sectional radius R1 and the second tube portion 154 has a second cross sectional radius R2. As illustrated, the first and second radii R1 and R2, respectively, are constant and equal. However, the first and second radii R1 and R2, respectively, may be other than constant and equal. The male snap 162 also has the first radius R1 and the female snap 168 has the second radius R2. Alternatively, the male and female snaps 162 and 168, respectively, may have other than the first or second radii R1 or R2, respectively.

The first tube portion 152 has first and second male channels or lips 174A and 174B, respectively. The first and second male channels 174A and 174B, respectively, run a length of the first tube portion 152. The second tube portion 154 has first and second female channels or lips 176A and 176B, respectively. The first and second female channels 176A and 176B, respectively, run a length of the second tube portion 154. When the first and second tube portions 152 and 154, respectively, are assembled to form the tube 136, the first and second male channels 174A and 174B, respectively, set in and abut the first and second female channels 176A and 176B, respectively, and prevent lateral movement between the first tube portion 152 relative to the second tube portion 154 and vice versa. Accordingly, the first and second male channels 174A and 174B, respectively, and the first and second female channels 176A and 176B, respectively, locate the first tube portion 152 relative to the second tube portion 154.

The tube 136 has a first opening 178 and a second opening 180. The tube 136 has a first tube guide, indicated generally at 182, at the first opening 178 and a second tube guide, indicated generally at 184, at the second opening 180. The first and second guides, 182 and 184, respectively, are formed from continuations of the first and second tube portions 152 and 154, respectively. As such, the first and second guides, 182 and 184, respectively, continue the curvature of the first and second tube portions 152 and 154, respectively. The first guide 182 enters the first ball nut opening 140 and the second guide 184 enters the second ball nut opening 142. The first and second guides 182 and 184, respectively, guide the balls 130 as they enter and exit the tube 136.

Figure 10:
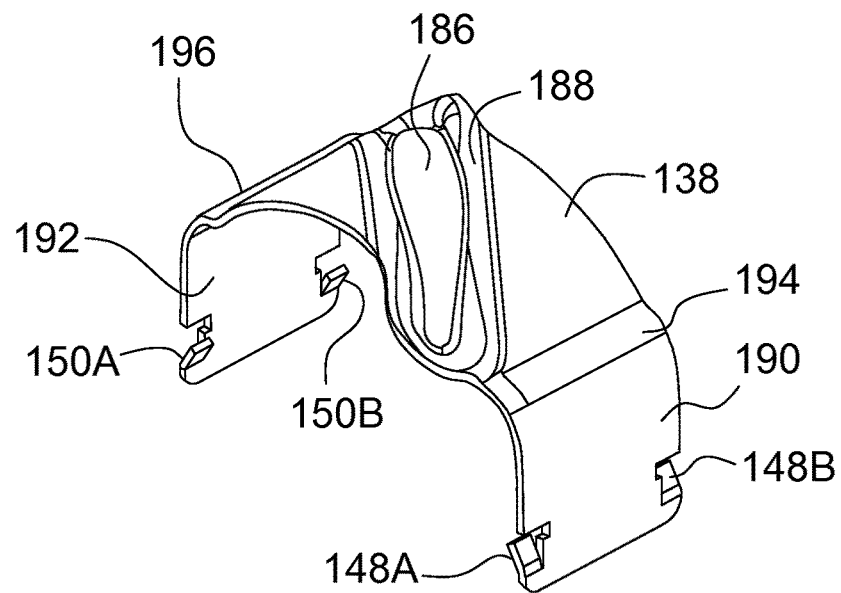
FIG. 10 is a perspective view of the tube retention clip used in the rack ball nut assembly of FIG. 1.
Figure 11:
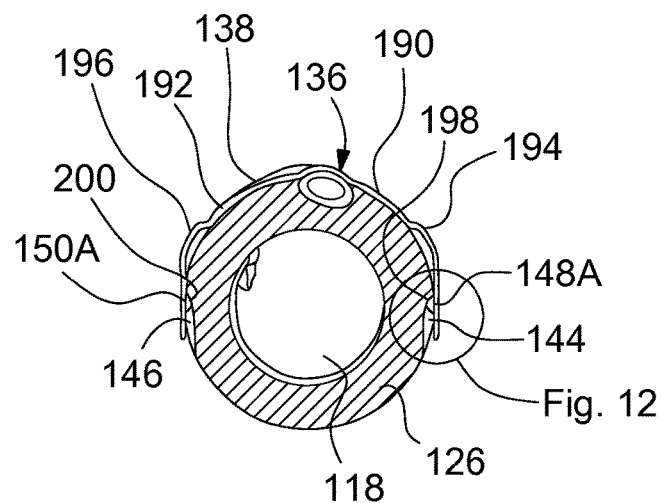
FIG. 11 is a sectional view taken along line 11-11 of FIG. 2.
Figure 12:
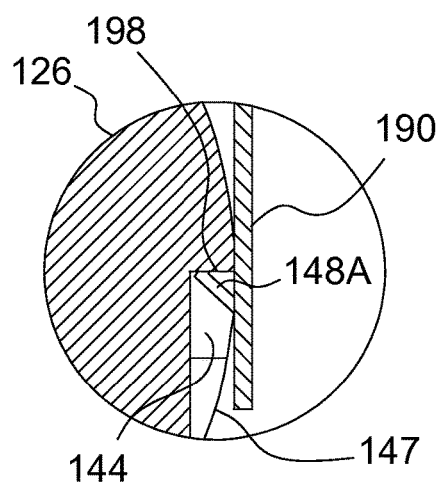
FIG. 12 is an enlarged portion of FIG. 11.

Referring now to FIGS. 10-12, the clip 138 is illustrated in detail. The clip 138 has an elongated dome 186 between opposing first and second legs 190 and 192, respectively. The dome 186 is fitted to the tube 136 such that the clip 138 secures the tube 136 to the ball nut 126. The dome 186 has a collar or lip 188 around the dome 186.

The first leg 190 has a first spring portion 194 and the second leg 192 has a second spring portion 196. The first recess 144 has a first stop surface 198 engaged by the first and second tabs 148A and 148B, respectively, and the second recess 146 has a second stop surface 200 engaged by the third and fourth tabs 150A and 150B, respectively.

When the first and second tabs 148A and 148B, respectively, are engaged in the first recess 144, a first tension force is produced in the first spring portion 194. When the third and fourth tabs 150A and 150B, respectively, are engaged in the second recess 146, a tension force is produced in the second spring portion 196. The first and second tension forces keep the first and second tabs 148A and 148B, respectively, engaged against the first stop surface 198 and the third and fourth tabs 150A and 150B, respectively, engaged against the second stop surface 200. As a result, the clip 138 is secured to the ball nut 126 and the return tube 136 is secured between the clip 138 and the ball nut 126.

Referring now to FIG. 13, there is illustrated a ball return tube, indicated generally at 336, for use with a second embodiment of a rack ball nut assembly 300 produced in accordance with the present invention. Because the rack ball nut assembly 300 is a variation of the rack ball nut assembly 100 of FIGS. 1-12, like reference numerals, increased by 200, designate corresponding parts in the drawings and detailed description thereof will be omitted.

First and second tube guides 382 and 384, respectively, are separate parts joined to the first and second tube portions 352 and 354, respectively, during assembly of the tube 336. Alternatively, each of the first and second tube guides 382 and 384, respectively, may be formed as part of the first or second tube portions 352 or 354, respectively. The first and second tube guides 382 and 384, respectively, do not continue a curvature of the tube 336. Instead, the first and second tube guides 382 and 384, respectively, are parallel. Alternatively, the first and second guides 382 and 384, respectively, may be other than parallel.

Figure 15:
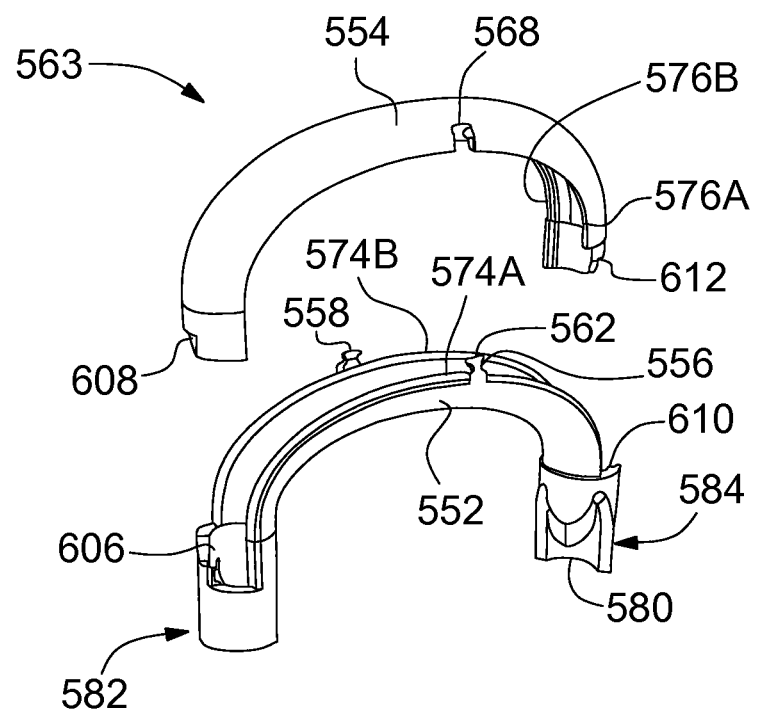
FIG. 15 is an exploded view of the ball return tube used in the rack ball nut assembly of FIG. 14.

Referring now to FIGS. 14 and 15, there is illustrated a ball return tube, indicated generally at 536, for use with a third embodiment of a rack ball nut assembly 500 produced in accordance with the present invention. Because the rack ball nut assembly 500 is a variation of the rack ball nut assembly 100 of FIGS. 1-12, like reference numerals, increased by 400, designate corresponding parts in the drawings and detailed description thereof will be omitted.

A first tube portion 552 has a lesser radius than a second tube portion 554. The tube 536 has first and second end features, indicated generally at 602 and 604, respectively, on opposite ends of the tube 536. The first end feature 602 has first and second complementary shaped portions 606 and 608, respectively, and the second end feature 604 has third and fourth complementary shaped portions 610 and 612, respectively. The end feature first and third portions 606 and 610, respectively, are part of the first tube portion 552 and the end feature second and fourth portions 608 and 612, respectively, are part of the second tube portion 554.

When the tube 536 is assembled, the end feature first portion 606 fits against the end feature third portion 610 and the end feature second portion 608 fits against the end feature fourth portion 612 such that the first tube portion 552 is located relative to the second tube portion 554. The first and second end features 602 and 604, respectively, also provide a smooth inner diameter of the tube 536.

As illustrated, a first interface 614 between the end feature first and third portions 606 and 610, respectively, and a second interface 616 between the end feature second and fourth portions, 608 and 612, respectively, each has a stepped profile. Alternatively, one or both of the first and second interfaces 614 and 616, respectively, may be other than stepped. For example, the first and second interfaces 614 and 616, respectively, may have complementary sloped or saw tooth profiles.

Figure 16:
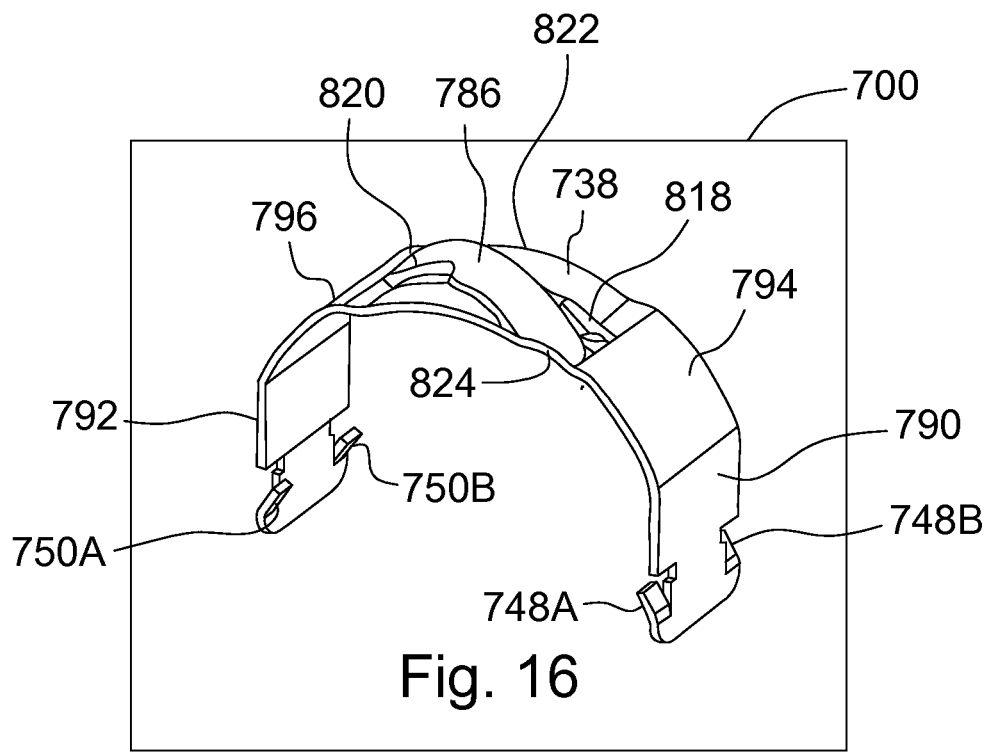
FIG. 16 is a perspective view of a tube retention clip used in a fourth embodiment of a rack ball nut assembly in accordance with the present invention.

Referring now to FIG. 16, there is illustrated a tube retention clip 738 for use with a fourth embodiment of a rack ball nut assembly 700 produced in accordance with the present invention. Because the rack ball nut assembly 700 is a variation of the rack ball nut assembly 100 of FIGS. 1-12, like reference numerals, increased by 600, designate corresponding parts in the drawings and detailed description thereof will be omitted.

A tube retention clip 738 has an elongated dome 786 with first and second dome extensions 818 and 820, respectively, to increase strength of the clip 738. The dome 786 stops at first and second edges 822 and 824, respectively—i.e., the dome 786 does not extend beyond a width of the clip 738.

Figure 17:
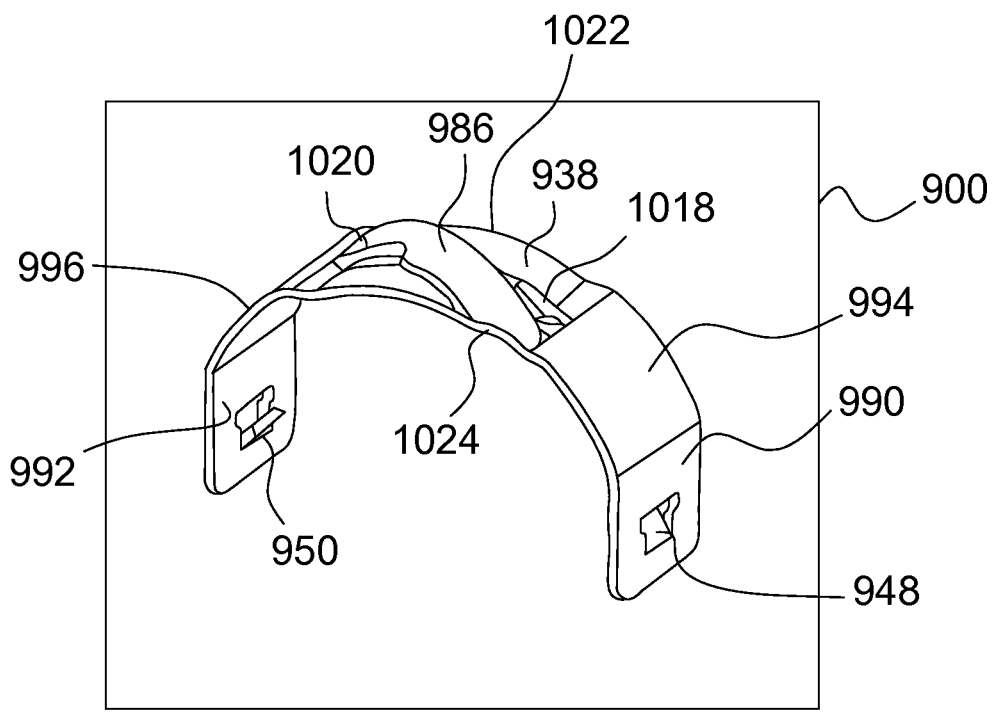
FIG. 17 is a perspective view of a tube retention clip used in a fifth embodiment of a rack ball nut assembly in accordance with the present invention.

Referring now to FIG. 17, there is illustrated a tube retention clip 938 for use with a fifth embodiment of a rack ball nut assembly 900 produced in accordance with the present invention. Because the rack ball nut assembly 900 is a variation of the rack ball nut assembly 100 of FIGS. 1-12, like reference numerals, increased by 800, designate corresponding parts in the drawings and detailed description thereof will be omitted.

A tube retention clip 938 has an elongated dome 986 with first and second dome extensions 1018 and 1020, respectively, to increase strength of the clip 938. A first clip leg 990 has a single broad first tab 948 and a second clip leg 992 has a single broad second tab 950. The first tab 948 is bordered by the first leg 990 and the second tab 950 is bordered by the second leg 992.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A rack ball nut assembly for a vehicle steering gear comprising:
    a ball nut having first and second recesses;
    a ball return tube having first and second tube portions;
    a snap fit between the first and second tube portions; and
    a tube retention clip having first and second retention tabs, wherein the first tab is engaged in the first recess, the second tab is engaged in the second recess, and the ball return tube is secured between the ball nut and the clip.

2. The rack ball nut assembly of claim 1 wherein the snap fit has a male snap on the first tube portion and a female snap on the second tube portion.

3. The rack ball nut assembly of claim 2 further comprising:
    a head portion of the male snap; and
    a receiving portion of the female snap, wherein the head portion is engaged in the receiving portion.

4. The rack ball nut assembly of claim 2 further comprising:
    a first cross sectional radius of the first tube portion;
    a second cross sectional radius of the second tube portion;
    a third radius of the male snap, wherein the third radius is equal to the first radius; and
    a fourth radius of the female snap, wherein the fourth radius is equal to the second radius.

5. The rack ball nut assembly of claim 1 further comprising:
    a male snap extending from the first tube portion, the male snap having head and stem portions, the head portion having a greater width than the stem portion; and
    a female snap in the second tube portion, the female snap having receiving and channel portions, the receiving portion having a greater width than the channel portion, wherein the head portion is restrained in the receiving portion by the channel portion.

6. The rack ball nut assembly of claim 1 further comprising:
    a male channel in the first tube portion; and
    a female channel in the second tube portion, wherein the male channel sets in the female channel and locates the first tube portion relative to the second tube portion.

7. The rack ball nut assembly of claim 1 further comprising:
    a dome portion of the clip, wherein the dome portion is fitted to the ball return tube.

8. The rack ball nut assembly of claim 1 further comprising:
    a first spring portion in a first leg of the clip; and
    a second spring portion in a second leg of the clip, wherein the first and second spring portions produce a tension force.

9. The rack ball nut assembly of claim 1 further comprising:
    an external surface of the ball nut, wherein the first and second recesses are in the external surface.

10. The rack ball nut assembly of claim 1 further comprising:
    a first end feature on the ball return tube and having complementary first and second end feature portions; and
    a second end feature on the ball return tube and having complementary third and fourth end feature portions, wherein the first and third end feature portions are on the first tube portion, the second and fourth end feature portions are on the second tube portion, the first end feature portion fits against the third end feature portion, and the second end feature portion fits against the fourth end feature portion.

11. The rack ball nut assembly of claim 1 further comprising:
    first and second openings in the ball nut, wherein the ball return tube connects the first and second openings; and
    a plurality of balls circulating through the ball return tube between the first and second openings.

12. The rack ball nut assembly of claim 1 further comprising:
    a steering member;
    a plurality of balls supporting the ball nut on the steering member;
    a first pulley rotationally secured to the ball nut;
    a second pulley driven by an electric motor; and
    a belt connecting the first and second pulleys.

13. A rack ball nut assembly for a vehicle steering gear comprising:
    a ball nut having first and second openings;
    a ball return tube having first and second tube portions, wherein the ball return tube connects the first and second openings;
    a snap fit between the first and second tube portions;
    a plurality of balls circulating through the ball return tube between the first and second openings;
    a male snap extending from the first tube portion, the male snap having head and stem portions, the head portion having a greater width than the stem portion; and
    a female snap in the second tube portion, the female snap having receiving and channel portions, the receiving portion having a greater width than the channel portion, wherein the head portion is restrained in the receiving portion by the channel portion.

14. The rack ball nut assembly of claim 13 further comprising:
    first and second recesses in the ball nut; and
    a ball return tube retention clip having first and second retention tabs, wherein the first tab is engaged in the first recess, the second tab is engaged in the second recess, and the ball return tube is secured between the ball nut and the clip.

15. The rack ball nut assembly of claim 14 further comprising:
- a first leg having the first retention tab and a first spring portion; and
- a second leg having the second retention tab and a second spring portion, wherein the first and second spring portions produce a tension force.

16. A rack ball nut assembly for a vehicle steering gear comprising:
- a ball nut having first and second recesses;
- a tube retention clip having first and second opposing legs;
- a first retention tab on the first leg;
- a second retention tab on the second leg, wherein the first tab is engaged in the first recess, and the second tab is engaged in the second recess;
- a first spring portion in the first leg; and
- a second spring portion in the second leg, wherein the first and second spring portions produce a tension force that secures a ball return tube between the ball nut and the clip.

17. The rack ball nut assembly of claim 16 further comprising:
- first and second openings through the ball nut;
- a ball return tube having first and second tube portions, wherein the ball return tube connects the first and second openings;
- a plurality of balls circulating through the ball return tube between the first and second openings;
- a male snap on the first tube portion; and
- a female snap on the second tube portion, wherein the male snap is engaged in the female snap and the ball return tube is secured between the ball nut and the clip.

18. The rack ball nut assembly of claim 16 further comprising:
- a ball return tube having first and second tube portions;
- a male snap extending from the first tube portion, the male snap having head and stem portions, the head portion having a greater width than the stem portion; and
- a female snap in the second tube portion, the female snap having receiving and channel portions, the receiving portion having a greater width than the channel portion, wherein the head portion is restrained in the receiving portion by the channel portion and the ball return tube is secured between the ball nut and the clip.

* * * * *